United States Patent Office 3,073,334
Patented Jan. 15, 1963

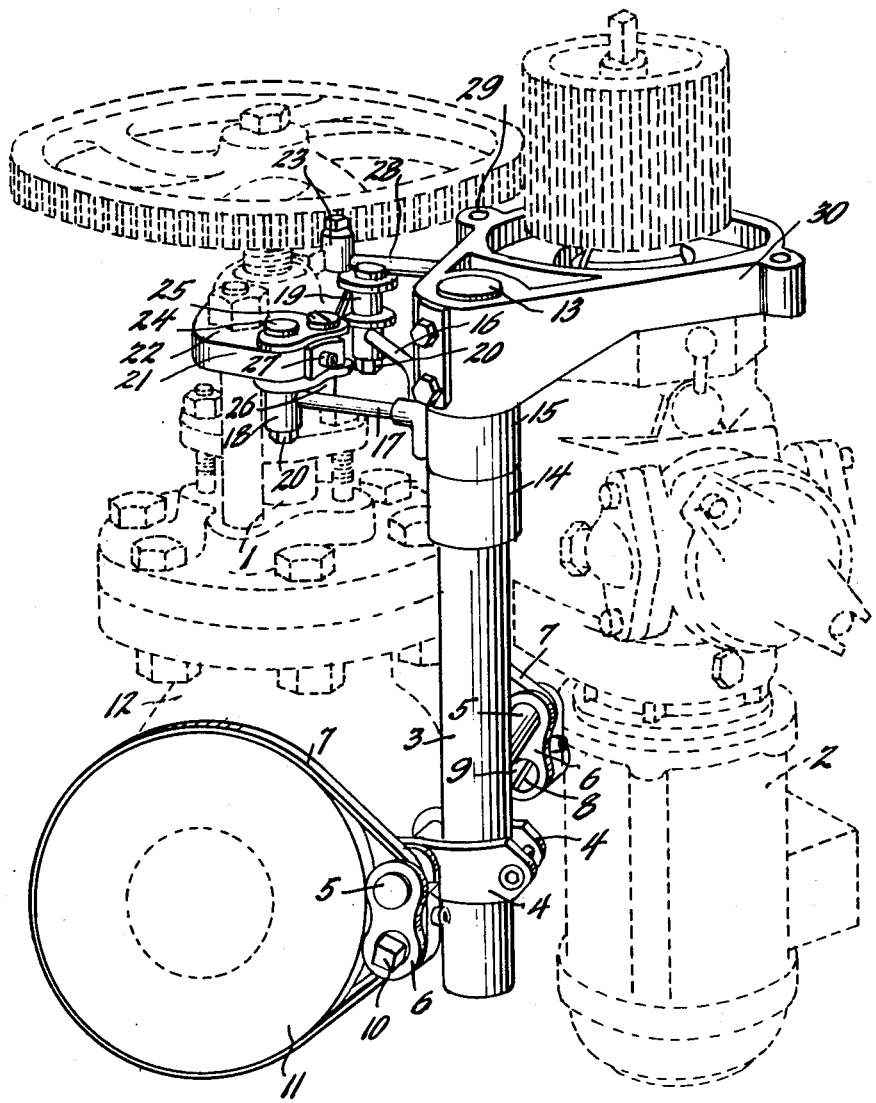

3,073,334
MEANS FOR FIXING A SERVO MOTOR FOR CONTROLLING SLUICE VALVES
Emile de Fays, Forest, Belgium, assignor to Societe Auxiliaire d'Industrie (Sadi) S.P.R.L., Carburants, Belgium
Filed June 16, 1959, Ser. No. 820,803
Claims priority, application Belgium June 19, 1958
3 Claims. (Cl. 137—269)

This invention relates to installations for controlling sluice valves.

It is becoming more and more usual to control sluice valves mechanically by installing next to them control members such as servo motors, for example.

Hitherto the valves have generally been converted to accommodate the control members, which necessitates tricky and sometimes expensive work.

Then again special valves have been proposed which themselves provide the seatings for the installation of control members. This type of special construction is obviously particularly costly and is only suitable when installing new valves.

The object of this invention is to remedy these disadvantages and to provide a means of fixing a servo motor for controlling sluice valves which can be fitted on the existing valves, without having to make any previous conversion or modification to the latter.

To this end the fixing means according to the invention is characterised by the feature that it comprises substantially a carrying shaft for a control device which is adjustable in position and is fixed by adjustable gripping bands to any existing part of a valve.

In a practical embodiment of the invention the gripping bands fixing the carrying shaft are arranged on the flanges of the valve.

A further shaft connects the two gripping bands fixed to the flanges and supports the carrying shaft which can move thereon.

To make the carrying shaft quite rigid and fix exactly its parallelism with the shaft of the valve, its free end carries collars which by way of adjustable rods are integral with a gripping band fixed to a flange on the head of the valve.

A third adjustable rod is arranged between the valve and the control device for fixing exactly the distance between the shafts of the valve and the motor.

The carrying shaft is provided with a swivelling collar-plate for supporting the control member.

So as to make the invention better understood, one embodiment thereof will now be described with reference to the accompanying drawing in which the fixing means is shown in perspective in solid lines, the existing sluice valve and the control device (servo motor) being shown in dotted lines.

In the drawing 1 is a sluice valve already installed, which is to be controlled by a control device such as a servo motor 2, for example.

The fixing means according to the invention, adapted to support the control device 2, consists of a carrying shaft 3 clamped between two half-collars fixed to and capable of moving on a shaft 5 carried by cheeks 6.

A gripping band 7 is partly wound round the shaft 5 and engages in a slot 8 provided on a tightening pin 9 having a square head 10, after passing round an existing part on the valve, in this case a flange 11.

The same device is provided for the other flange (not visible) of the body 12 of the valve.

The free end 13 of the carrying shaft 3 receives two sleeves 14 and 15, of which the first is integral with a rod 16 which may be curved and the second with a rod 17, the said rods passing into spindles 18 and 19 where they are fixed in a suitable position by fixing screws 20, the regulation of which maintains the parallelism of the carrying shaft 3 and the shaft of the valve.

A metallic band 21 similar to the band 7 is arranged around the flange 22 of the valve. It is partly wound round the spindle 18, passes round a spindle 23, which will be described hereunder, and also passes round the spindle 19; it then engages in a slot 24 on a tightening pin 25 with square head 26.

To keep the bands 7 and 21 tight, screw fixing clamps 27 are provided in the cheeks 6.

The spindle 23 also receives a rod 28 which may be bent and engages in an opening in a collar-plate 30 which swivels about the end 13 of the carrying shaft 3. The position of this collar-plate may thus be determined and fixed, the servo-motor 2 being supported by the said collar-plate.

Under these conditions it will easily be understood that any mechanical control device may be installed without prior modification or arrangement on existing valves, whatever their diameter, volume and position, solely by using parts or members of the valve as support for the control device, the control of the valve by the motor being able to be carried out by any suitable means, gearing, belts, chain, etc.

I claim:

1. A device for attaching a control motor to a valve having at least one fixed casing element, said device comprising a supporting rod; a motor-mounting member mounted on said rod; and means for positioning said rod in spaced generally parallel relationship to said valve comprising a pair of rigid arms, each rotatably connected to said rod at spaced points along its length and projecting generally radially thereof, flexible band coupling means adapted to encircle said casing element, said coupling means including means for adjusting length of and tension in said band, and means on the other end of each of said rods for engagement by said band, whereby the length of said band and the radial disposition of said rigid arms may be modified to accommodate casing elements of varying sizes.

2. A device as in claim 1 wherein said valve includes a second fixed casing element spaced from the first casing element and said device includes a second flexible band coupling adapted to encircle said second casing element and means for connecting said seconding coupling means to said rod at a point spaced from said rigid arms.

3. A device as in claim 1 wherein the motor mounting means comprises a bracket mounted for pivotal movement with respect to said rod and adapted to be secured in any given position, said bracket extending generally at right angles to said rod, and including a positioning arm rigidly connected to said bracket and terminating in an angular extension, said extension being adapted to be engaged by said band to brace said bracket against movement.

References Cited in the file of this patent
UNITED STATES PATENTS
1,473,634   Loudon _____ Nov. 13, 1923
1,706,700   Linendoll _____ Mar. 26, 1929
FOREIGN PATENTS
811,640   Great Britain _____ Apr. 8, 1959

UNITED STATES PATENT OFFICE
CERTIFICATE OF CORRECTION

Patent No. 3,073,334                                January 15, 1963

Emile de Fays

It is hereby certified that error appears in the above numbered patent requiring correction and that the said Letters Patent should read as corrected below.

In the grant, line 2, and in the heading to the printed specification, line 5, for "Carburants", each occurrence, read -- Forest --.

Signed and sealed this 29th day of October 1963.

(SEAL)
Attest:

ERNEST W. SWIDER                            EDWIN L. REYNOLDS
Attesting Officer                         Acting Commissioner of Patents